United States Patent
Sillasto

(10) Patent No.: US 7,633,443 B2
(45) Date of Patent: Dec. 15, 2009

(54) ESTIMATING LOCATION OF A COMMUNICATIONS DEVICE

(75) Inventor: Eero Sillasto, Helsinki (FI)

(73) Assignee: Nokia Corporation, Espoo (FI)

( * ) Notice: Subject to any disclaimer, the term of this patent is extended or adjusted under 35 U.S.C. 154(b) by 108 days.

(21) Appl. No.: 11/475,119

(22) Filed: Jun. 27, 2006

(65) Prior Publication Data

US 2006/0290568 A1    Dec. 28, 2006

(30) Foreign Application Priority Data

Jun. 28, 2005    (FI) ................................. 20050688

(51) Int. Cl.
*G01S 3/02*    (2006.01)

(52) U.S. Cl. ...................................... 342/464

(58) Field of Classification Search .......... 342/461–465
See application file for complete search history.

(56) References Cited

U.S. PATENT DOCUMENTS 5,218,367 A * 6/1993 Sheffer et al. ............... 342/457
7,120,431 B1 * 10/2006 Huo et al. ................... 455/423
2004/0152471 A1 * 8/2004 MacDonald et al. ........ 455/456.1

FOREIGN PATENT DOCUMENTS

WO    WO 2004/028170    4/2004

OTHER PUBLICATIONS

3GPP TS 25.305 V4.6.0, Sep. 2003, Technical Specification, "$3^{rd}$ Generation Partnership Project; Technical Specification Group Radio Access Network; Stage 2 functional specification of User Equipment (UE) positioning in UTRAN (Release 4)", pp. 1-49.

* cited by examiner

Primary Examiner—Thomas H Tarcza
Assistant Examiner—Nga X Nguyen
(74) Attorney, Agent, or Firm—Squire, Sanders & Dempsey, L.L.P.

(57) ABSTRACT

In determining a location estimate for a communications device, at least one first location estimate is determined based on information relating to signals transmitted between the communications device and at least one first antenna of a communications system. At least one second antenna of the communications system is determined, the at least second antenna not used for communication by the communications device. Thereafter, a second location estimate for the communications device is determined based at least on the at least one first location estimate and information relating to the at least one second antenna.

54 Claims, 8 Drawing Sheets

ESTIMATING LOCATION OF A COMMUNICATIONS DEVICE

BACKGROUND OF THE INVENTION

1. Field of the Invention

The present invention relates to estimating location of a communications device. In particular, the present invention relates to estimating location of a communications device based on signals transmitted between the communications device and antennas of a communication system.

2. Description of the Related Art

A communication system can be seen as a facility that enables communication between two or more entities such as user equipment and/or other nodes associated with the system. The communication may comprise, for example, communication of voice, data, multimedia and so on. The communication system may be circuit switched or packet switched. The communication system may be configured to provide wireless communication.

Positioning services have become very popular in the recent years. Positioning refers here to determining or estimating the location of a communications device. The communications device may be capable of determining its position based on signals it receives. The signals can be sent either from a specific positioning system or, for example, from a cellular communications system. Alternatively, the communications device may act as a measurement device and send measurement results to a further unit, which then determines the location of the communications device.

Positioning services may be used simply for locating the communications device. The location of the communications device may, for example, be shown on a map at the display of the communications device. Alternatively, it is possible to provide location-dependent services, for example, for users of a communication system. The location of the communications device may affect the content of a location-dependent service. A further option is that the location of the communications device is used for determining whether the service is provided to the communications device at all.

One important application for positioning services is emergency calls. It can be very useful to automatically determine the location of a communications device, from which an emergency call is originating. Certain countries have specified criteria for the accuracy of positioning a communications device. It is, however, appreciated that accuracy of the location estimates is important also for other applications than for emergency calls.

Locating a communications device in a communications system is typically based on measuring time differences between signals sent from antennas of the communications system and signals received from the communications device in the antennas of the communications system. Typically the accuracy of location estimation is increased by the number of antennas via which signals are transmitted between the communications device and the communications system.

FIG. 1a shows schematically one example, where the accuracy of location estimation may be quite low. In FIG. 1a, signals are transmitted between a communications device 101 and only one antenna 111 of a communications system. An antenna may be omni-directional or directional. Antenna profile refers to the angular distribution of radiation emitted from an antenna. The antenna 111 in FIG. 1a is directional, and the arrow in FIG. 1a shows schematically the direction into which radiation is emitted most efficiently from the antenna 111.

From measuring time differences between transmitted and received signals, it is possible to estimate the distance between the communications device 101 and the antenna 111. This distance, together with the antenna profile, defines an arc which represents the location estimate of the communications device. The angular width of the arc may be, for example, the half power beam width (HPBW) of the antenna. The width of the arc in a situation shown in FIG. 1a is typically quite wide, so the accuracy of the location estimate is quite poor.

It is appreciated that a similar situation than in FIG. 1a occurs, if signals are transmitted between a communications device and two or more antennas, which are located at the same antenna site. In this case, the measurements relating to the different antennas increase the accuracy of the distance measurement. Regarding the angular location, a common assumption is to locate the communications device at an angle where the antenna profiles of the antennas overlap. Based on the timing measurements, however, it is not possible to increase the accuracy of the angular location estimate.

FIG. 1b shows a second example, where the accuracy of location estimation may be quite low. In FIG. 1b, signals are transmitted between the communications device 101 and two antennas 111a, 111b of the communications system. These antennas 111a and 111b are located at separate antenna sites. Based on timing measurements, it is possible estimate the distance between the first antenna 111a and the communications device 101 and the distance between the second antenna 111b and the communications device 101. As FIG. 1b shows, these distance may define two arcs (circles) which cross each other at two points. The communications device is located near one of these points. Based on the timing measurements it is not possible to determine, which of the location estimates is a better location estimate for the communications device.

Timing measurements are typically available only for active radio links. To limit load in a communications system, there typically is a need to limit the number of active radio links allocated to a communications device. This limitation of active radio links makes the likelihood of calculating a location estimate based on information relating to only one antenna site or one antenna much higher than the likelihood of calculating a location estimate using measurement relating to two or more sites.

There are thus problems relating to estimating location of a communications device. Problems occur especially in cases, where the number of antenna sites involved in the location estimation is only one or two. It is, however, appreciated that similar problems may occur also when a larger number of antenna sites is involved in the location estimation.

Aim of embodiments of the present invention is to address the location estimation accuracy problems discussed above and to estimate location of a communications device.

SUMMARY OF THE INVENTION

A first aspect of the present invention provides a method for determining location estimate for a communications device, the method comprising determining at least one first location estimate for the communications device based on information relating to signals transmitted between the communications device and at least one first antenna of a communications system, determining at least one second antenna of the communications system, the at least second antenna not used for communication by the communications device, and determining a second location estimate for the communications device based at least on the at least one first location estimate and information relating to the at least one second antenna.

A second aspect of the present invention provides a communications system comprising a plurality of antennas, the communications system being configured to determine at least one first location estimate for a communications device based on information relating to signals transmitted between the communications device and at least one first antenna of the communications system, determine at least one second antenna of the communications system, the at least second antenna not used for communication by the communications device, and determine a second location estimate for the communications device based at least on the at least one first location estimate and information relating to the at least one second antenna.

A third aspect of the present invention provides a network element for a communications system comprising a plurality of antennas, the network element being configured to determine at least one first location estimate for a communications device based on information relating to signals transmitted between the communications device and at least one first antenna of a communications system, determine at least one second antenna of the communications system, the at least second antenna not used for communication by the communications device, and determine a second location estimate for the communications device based at least on the at least one first location estimate and information relating to the at least one second antenna.

A fourth aspect of the present invention provides a communications system comprising a plurality of antennas, means for determining at least one first location estimate for a communications device based on information relating to signals transmitted between the communications device and at least one first antenna of the communications system, means for determining at least one second antenna of the communications system, the at least second antenna not used for communication by the communications device, and means for determining a second location estimate for the communications device based at least on the at least one first location estimate and information relating to the at least one second antenna.

A fifth aspect of the present invention provides a network element for a communications system comprising a plurality of antennas, the network element comprising means for determining at least one first location estimate for a communications device based on information relating to signals transmitted between the communications device and at least one first antenna of a communications system, means for determining at least one second antenna of the communications system, the at least second antenna not used for communication by the communications device, and means for determining a second location estimate for the communications device based at least on the at least one first location estimate and information relating to the at least one second antenna.

BRIEF DESCRIPTION OF THE DRAWINGS

Embodiments of the present invention will now be described by way of example only with reference to the accompanying drawings, in which.

DETAILED DESCRIPTION OF EMBODIMENTS OF THE INVENTION

Figure 2:
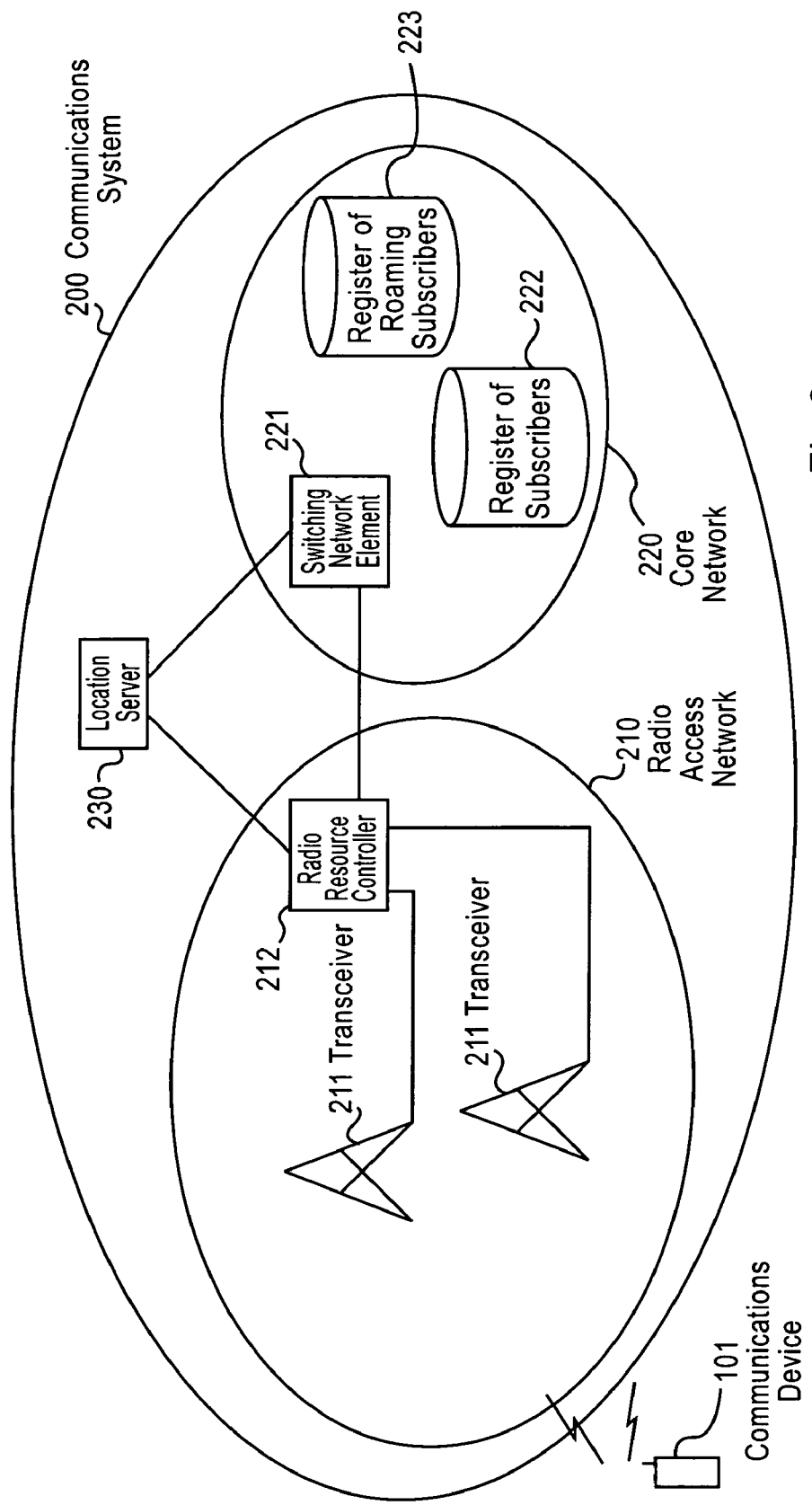
FIG. 2 shows schematically a cellular communications system as an example of a communications system where embodiments of the invention are applicable.

FIG. 2 shows schematically a communications system 200 as an example of a system, where embodiments of the present invention are applicable. The communications system 200 is a cellular communications system, but embodiments of the invention could be applied any communications system having a plurality of antenna sites.

The communication system 200 contains a radio access network 210 and a core network 220. The radio access network 210 has a plurality of radio resource controllers 212. A radio resource controller 212 may control a plurality of transceiver network elements 211, which are typically connected to a radio resource controller with a fixed line connection or, for example, with a point-to-point radio or microwave link. A radio resource controller 212 is responsible for controlling and managing the radio resources in a transceiver network element 211. The core network 220 contains switching network elements 221, a register 222 containing information about subscribers of this communication system, and a register 223 containing information about subscribers roaming in this communication system. FIG. 2 illustrates, as an example, only one radio resource controller 212. A location services architecture may be logically implemented in the communications system 200 through the addition of one network node, the location server 230.

A transceiver network element 211 may relate to one cell or to more than one cell. There is provided at least one antenna for a transceiver network element for transmitting and receiving signals. Antennas of more than one cell may be co-located. For example, three directional antennas, each relating to a separate cell, may be located at a single antenna site.

As an example, consider a Global System for Mobile Communications (GSM). In a GSM system, a transceiver network element is called a base station (BS), a radio resource controller is called a base station controller (BSC), a switching element is called a mobile switching center (MSC), and the registers are called a home location register (HLR) and a visitor location register (VLR). The location server is called a mobile location center (MLC).

As a further example, consider a cellular communications system in accordance with the 3GPP (Third Generation Partnership Project) technical specifications. In such a system, a transceiver network element is called a Node B, a radio resource controller is called a radio network controller (RNC). The network elements of the circuit-switched core network have the same names as in the GSM system. It is appreciated that a communications system in accordance with the 3GPP specifications typically supports also packet-switched data transmission, and it contains network element for this purpose. These network elements are, however, not discussed here in more detail. The location server is called a mobile location center.

In the following, reference is mostly made to a communication system in accordance with the 3GPP specifications, but embodiments of the present invention are applicable also in other communications systems.

In the following some location estimation methods are first discussed. These location estimation methods are applicable to provide initial location estimates for the communications device. In the appended claims and in the embodiments of the invention, these initial location estimates are called first location estimates. It is appreciated, however, that the first location estimate or estimates can be obtained using other location estimation methods than the ones discussed below.

The location estimation methods discussed are based on cell identity (CI) and on round trip time (RTT) measurements. Therefore these methods are often called CI+RTT location methods. The CI+RTT location methods have been developed for W-CDMA mobile communications networks, but their application can be extended to other communications systems. In the 3GPP Technical Specifications, the CI+RTT location methods are referred to as "Cell ID based positioning method". See, for example, Section 4.3.1 in technical specification TS 25.305 "Stage 2 functional specification of User Equipment (UE) positioning in UTRAN", Release 4, version 4.6.0.

The CI+RTT-based location calculation algorithm uses typically a combination of Radio Network Data and CI+RTT Measurement Data to obtain the final result. To ensure that the CI+RTT location calculation algorithm is capable of estimating the location of the communications device in various network and measurement configurations, a number of Location Methods are supported by the CI+RTT location calculation algorithm.

Measurement Data, and particularly Round Trip Time (RTT) and UE Rx-Tx Time Difference (TD) delay measurements, for at least one of the active radio links is provided to the CI+RTT location calculation algorithm for using the distance information in the location calculation.

An RTT measurement represents the time between the instant of transmitting a specific signal in a Node B, and the time receiving its counterpart also in the Node B. The UE Rx-Tx time difference is the time that elapses in the communications device between it receives the aforementioned signal from the Node B, and the time instant the communications device sends a relating signal back to the Node B.

The CI+RTT Location Methods relating to the CI+RTT location calculation algorithm can be classified in to Cell Identity location methods, Single-site CI+RTT Location Methods, and Multi-site CI+RTT Location Methods.

Cell Identity location methods determine a location estimate and the associated confidence region by processing only a (sub)set of Radio Network Data. No Measurement Data are used. The CI Location Methods are normally used as fallback methods, when a distance estimate cannot be obtained from any of the active radio links (e.g., because not any valid pair of RTT and TD measurements was provided to the location algorithm).

These methods can handle the case of single and multiple serving cells. The location estimate for the communications device is calculated at the mass center of a certain geographical region, which is defined by the serving cells' coverage area. There are various CI location methods. As some examples, the published international application WO2004028170 describes the following methods: analytical single-cell CI, multi-cell CI and approximated multi-cell CI location methods.

Single-site CI+RTT location methods are applied when one or more cells, all co-located with each other (in other words, the number of antenna sites is one), serve the communications device. In this situation, the communications device is in softer handover or is connected to only one cell. The location estimation is performed by combining one distance estimate, obtained from the valid (RTT, TD) pairs, with the network data of the serving cells. These methods can handle the case of multiple serving cells, provided that their antennas are physically located at the same geographical location.

Single-site CI+RTT location methods estimate the location of the communications device typically in a polar reference system centered at the serving site. The distance (radial part) of the location estimate of the communications device from the polar reference system's origin is estimated from the RTT and TD measurement pairs available. The orientation of the location of the communications device (the angular part of the location estimate) in the polar reference system is obtained by processing the bearings of the serving antennas.

Owing to the geometry of the location problem, an arc is the natural confidence region in case of Single-site CI+RTT location calculation. Hence, an arc-shaped confidence region is calculated first and then, if needed, converted into either a polygonal or an elliptical confidence region.

Multi-site CI+RTT Location methods determine a location estimate and the associated confidence region when the communications device has multiple active radio links from geographically distributed cells. In other words, multi-site CI+RTT location methods are used when the communications device is making a soft handover. The estimation is performed by combining two or more distance estimates, obtained from the valid (RTT, TD) pairs, with the network data of the serving cells. These methods can handle the case of multiple serving cells, provided that their antennas are physically located in at least two different geographical locations.

In the context of CI+RTT location technology, a site refers to the location of antennas for one or many cells having antennas physically located in one geographical location, or at least very close to each other. Depending on the cases, one or more (RTT, TD) measurement pairs from co-located active cells may be combined into a single distance estimate, which then represents an estimate of the distance between the communications device and the site where the serving cells' antennas are located. To calculate the number of sites used in CI+RTT location methods, all cells providing an active radio link are examined and the ones having antennas close enough are considered co-located. All co-located cells are then considered as one site from which multiple distance measurements are available.

CI+RTT Location Methods typically determine a confidence region along with the location estimate. The combination of location estimate and confidence region parameters resulting from a CI+RTT location calculation is referred to as Shape. The CI+RTT location calculation can be performed using a number of location methods and the calculation results can be represented with a number of shapes.

Each CI+RTT location method is typically implemented by one or more Location Algorithms. Location algorithms can calculate either a location estimate (location estimate calculation algorithms) or a confidence region (confidence region calculation algorithms).

All CI+RTT location calculation algorithms, with the exception of the Cell Identity-based algorithms, process distances between the communications device and the serving Node B's to determine location estimate and confidence region. Since the distance estimation algorithm is a fundamental element of the CI+RTT algorithms, it is addressed in greater details in the following.

Figure 3:
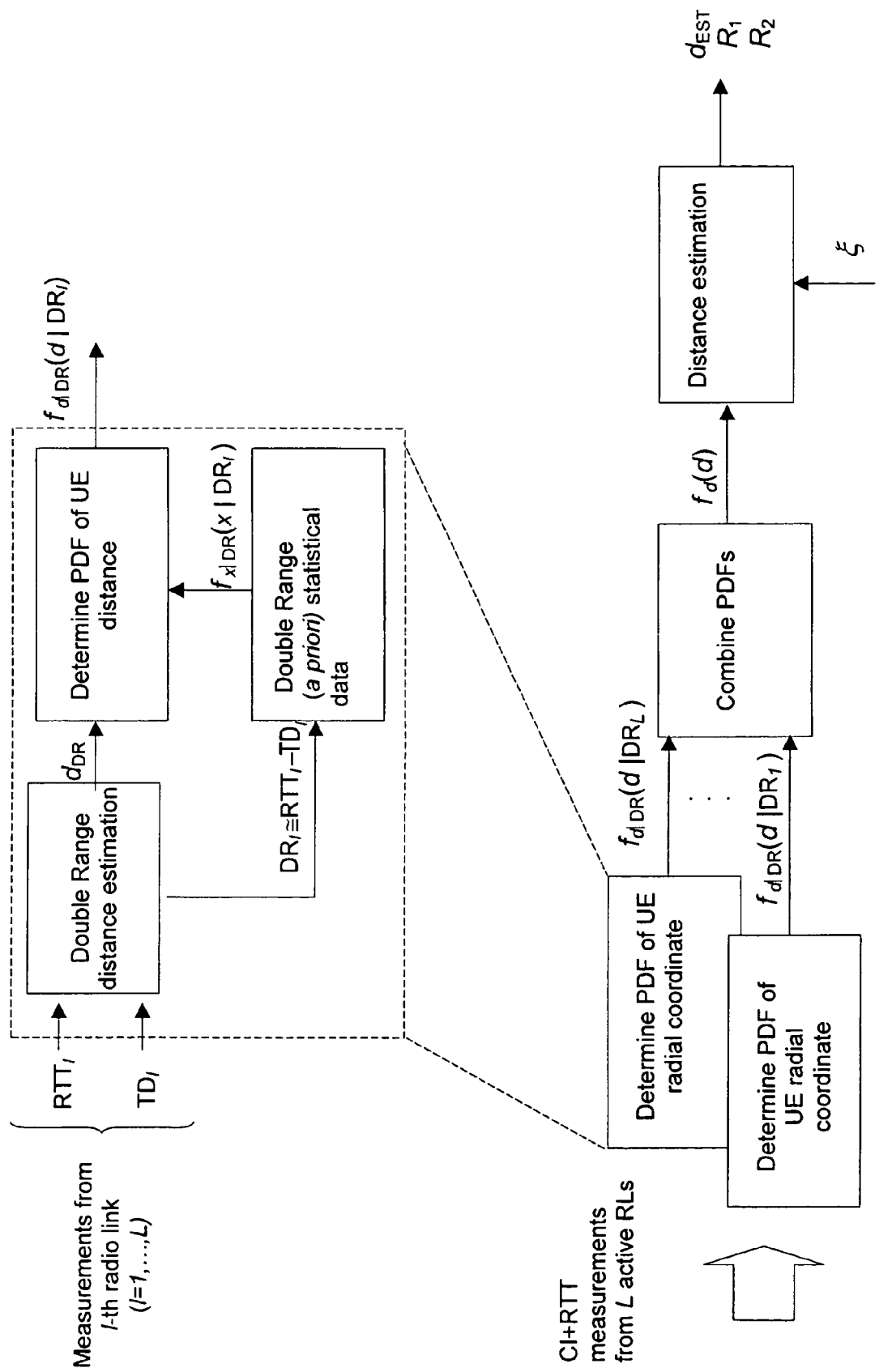
FIG. 3 shows schematically, as an example of determining first location estimates for the embodiments of the invention, how a distance estimate is determined from a set of timing measurements.

FIG. 3 shows schematically how one distance estimate is obtained from a set of RTT and TD measurement pairs, all of them measured from active radio links supplied by co-located cells. The number of active radio links from co-located cells is denoted with L in FIG. 3. If the communications device has active radio links from spatially separated cells, or if the location algorithms request it, a separate distance estimate can be calculated from each RTT and TD measurement pair available. These are special cases of the general case represented in FIG. 3.

The initial part of the distance estimation from multiple co-located serving cells consists in calculating a Double Range distance estimate $d_{DR}$ from each RTT and TD measurement pair. $d_{DR}$ is an estimate, expressed in meters, of the distance between the communications device and a serving cell. It is calculated by "converting" into meters an integer number, the so-called Double Range (DR), which is obtained by removing the TD contribution from RTT.

Given the exact distance between the communications device and a serving cell, d, it is possible to calculate the Double Range measurement error, $x=d-d_{DR}$ (in other words, the difference between $d_{DR}$ and exact distance between the communications device and the serving cell). Such error is originated by several factors: for example, by multipath and non line-of-sight propagation, measurement algorithms inaccuracy, or granularity introduced by the measurements' finite resolution. Part or all of such contributions may be compensated by using the so-called Double Range statistical data, which represents the probability density function (PDF) of the DR measurement error. The PDF of the DR measurement error, $f_{x|DR}(x|DR)$, is combined with the DR distance estimate, $d_{DR}$, to obtain the PDF of the UE distance from each co-located serving cell, $f_{d|DR}(d|DR)=f_{x|DR}(x=d-d_{DR}|DR)$.

The PDFs of the distance from all the co-located serving cells are then combined into one PDF, $f_d(d)$, representing the PDF of the UE distance from the site where all serving cells' antennas are installed. Once the combined PDF is available, the distance estimation can be performed. The result of distance estimation is represented by three values:

a distance estimate, $d_{EST} \geq 0$
an inner radius, $0 \leq R_1 \leq d_{EST}$
an uncertainty radius, $R_2 \geq 0$ The distance estimate is determined based on the probability density function. One example is to calculate the distance estimate as median of the combined distance distribution. Another example is a (weighted) average. The inner and uncertainty radii define a confidence interval $[R_1, R_1+R_2]$ within which the exact communications device distance d is estimated to fall with a pre-defined confidence coefficient, ξ. The value of the confidence coefficient depends on the target confidence level requested by the user of the CI+RTT location algorithms.

Figure 4A:
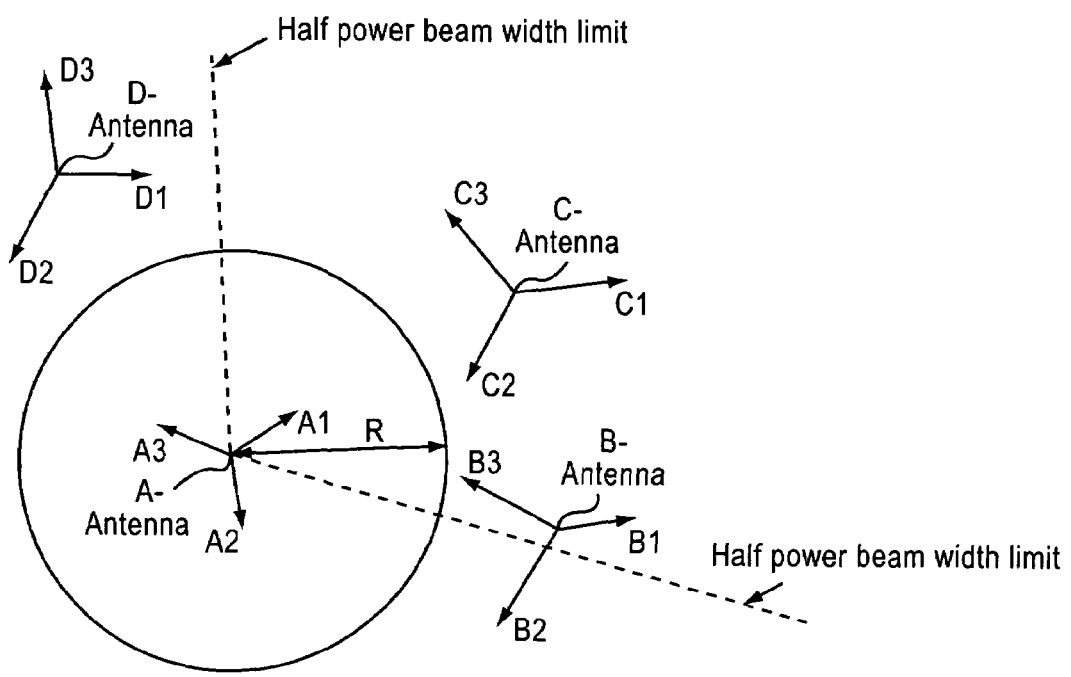
FIG. 4a shows schematically four antenna sites and their antennas.

FIG. 4a shows, as an example, schematically a plurality of antenna sites. Each cell of a cellular communications system has at least one antenna. In this discussion, it is assumed that each cell has one antenna, but it is appreciated that embodiments of the present invention are not restricted to such communications systems. Antennas of a number of cells may be located at a single location (in other words, the antennas are co-located) or, in practice, so near each other that the antennas can be considered to be co-located.

FIG. 4a shows schematically four antenna sites A, B, C and D. Each of these four antenna sites has three antennas. For example, antennas of the antenna site A are shown with arrows A1, A2 and A3. The half power beam width of antenna A1 is shown with dashed lines.

Consider a case, where signals are transmitted between a communications device and the communications system only via antenna A1. In this case, location estimate based on timing measurements is a radial distance from the antenna site A. This radial distance is shown in FIG. 4a with the radius R. The timing measurements do not give information about the angular location of the communications device with respect to the antenna site A.

Figure 5:
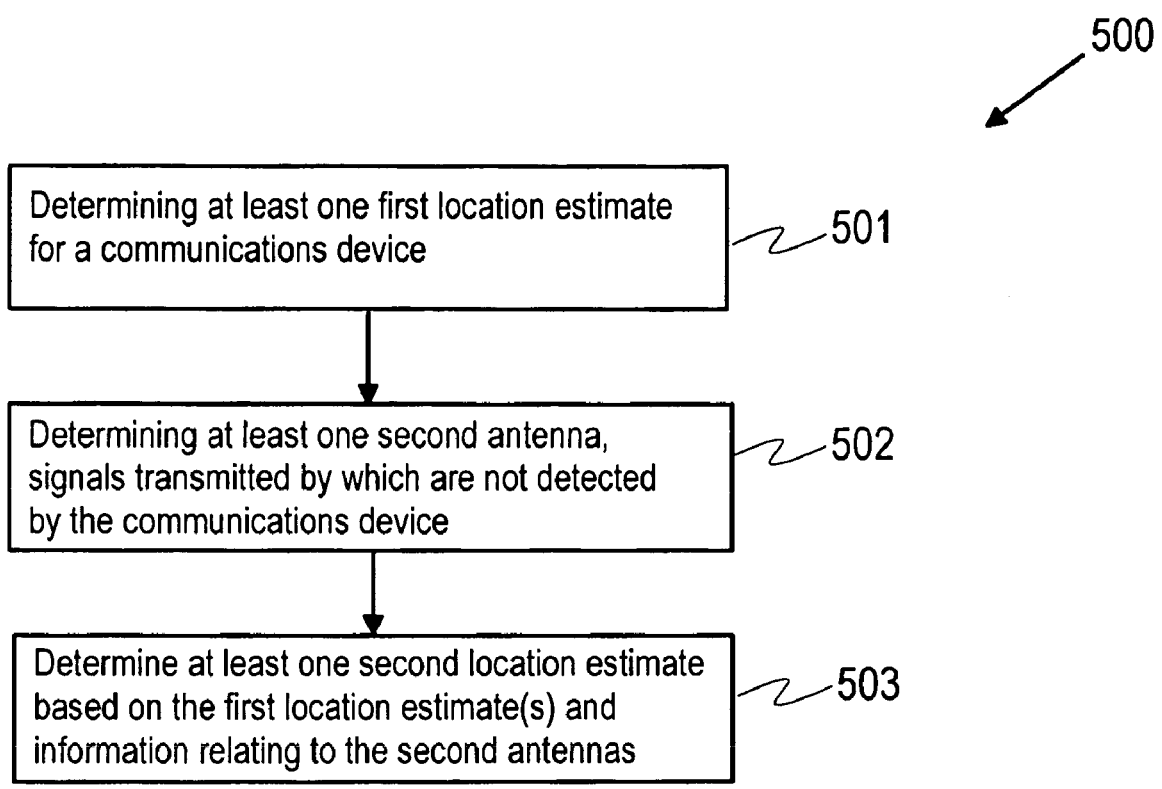
FIG. 5 shows a flowchart of a method in accordance with a first embodiment of the present invention.

FIG. 5 shows a flowchart relating to a method 500 in accordance with a first embodiment of the present invention. This method 500 is a method of determining location estimate for a communications device. In step 501, at least one first location estimate for the communications device is determined based on information relating to signals transmitted between the communications device and at least one first antenna. This at least one first location estimate may be determined using, for example, one of the location estimation methods discussed above.

This first location estimate may represent a single point, where the communications device is estimated to be located. Alternatively, the first location estimate may be a set of points representing an area, where the communications device is estimated to be located. If the first location estimate is a set of points, the first location estimate may provide information also about the accuracy of the location estimation. The first location estimate may represent, for example, a point of most probable location and an uncertainty area.

Referring to the example shown in FIG. 4a, the at least one first antenna in the antenna A1 and the at least one first antenna site is the antenna site A. The radius estimate R forms at least part of a first location estimate. In addition, there may be available an angular part of the first location estimate. For example, the main direction of the antenna beam may be provided as an angular part of a first location estimate, and the half power beam width of the antenna beam may be provided as an accuracy estimate for the angular location estimate.

If there would be timing measurements relating to, for example, the antenna A3, then in the example in FIG. 4a the location estimates from separate timing measurement results relating to the antennas A1 and A3 might be combined to a single first location estimate. Alternatively, the separate location estimates could be handled as separate first location estimates.

In step 502, at least one second antenna is determined based on the criterion that the communications device is not using the at least one second antenna for communication. The signals transmitted by the at least one second antenna may be so weak that they are not detected by the communications device at all, or the signal level of a second antenna may be below a threshold defined for selecting the second antenna cell into an active set. Typically it is further required that the second antennas are in the vicinity of the first antennas and that the second antennas are available for communication. This is because signals, which are sent from antennas very far from the first antennas (from the location of the communications device), are not detected by the communications device. Information about antennas very far from the first antennas thus typically is not useful for increasing accuracy of a location estimate for a communications device. One example of determining the second antennas is to determine which antennas of the communications system are within a certain distance from the first location estimate and then to determine which of these antennas are not used for communication by the communications device. In the example shown in FIG. 4a, antennas located at sites B, C, and D may be used as second antennas. It is possible to use, in addition to antenna location information, also antenna direction information, or even more detailed antenna profile information, in determining the second antennas. In this case, the antennas near the location(s) of the first antenna(s) and directed towards the first location estimate may be used as second antennas. Referring to FIG. 4a, antennas B3, C2, C3, and D1 may be used as second antennas.

The communications system is able to determine those antennas, which are not used for communication by the communications device. This may be done, for example, based on information about the active set or based on absence of any measurement results relating to these antennas.

In step 503, a second location estimate for the communications device is determined based at least on the at least one first location estimate and information relating to the at least one second antenna. The information relating to the second antenna(s) may be, for example, location information (antenna site location), antenna direction information, antenna profile information and/or estimated path loss information. The estimated path loss information is typically based on general path loss models or on antenna and environment specific information, which has been earlier determined for this specific second antenna. It is not necessary to have signal strength measurements relating to the signals transmitted by the second antennas for this estimated path loss information. The second location estimate in the first embodiment of the present invention is based on information characterizing the second antennas, not on measured information relating to signals transmitted from the second antennas.

In some embodiments of the invention, only location information relating to the second antennas is used in determining the second location estimate. This location information is typically available when estimating location of a communications device, as antenna location information is needed for locating the communications device. One example of using location information is to determine distances between the possible locations of the communications device, defined by the first location estimate(s), and the second antenna locations. Those possible locations of the communications device that are nearer the first antenna(s) than the second antenna(s) are more probable than those possible locations that are nearer the second antenna(s) than the first antenna(s).

In some further embodiments of the invention, antenna location information is used together with path loss information in determining the second location estimate. In some embodiments of the invention, antenna location information is used together with antenna profile information and path loss information. It is also possible to use antenna location information together with antenna profile information.

The second location estimate may, similarly as the first location estimate, be a single point or a set of points. The second location estimate may represent, for example, a point of most probable location of the communications device and an uncertainty area. Information about the second antennas may affect the estimated most probable location of a communications device and an estimated uncertainty area.

There may be one or more than one first antenna located at a single antenna site. Alternatively, there may be at least two first antennas, located at multiple antenna sites. Similarly, there may be one or more than one second antenna located at a single antenna site. Alternatively, there may be at least two second antennas, located at multiple antenna sites. It is possible that at least one second antenna is co-located with at least one one first antenna. Referring to the example in FIG. 4a, antennas A2 and A3 may be used as second antennas, if the communications device does not detect signals from these antennas. Alternatively, in some situations it may be advisable to require that the second antennas are located at separate antenna sites than the first antennas.

The communications device may communicate with a communications system via the first antenna(s). If there are more than one first antenna, this means that the communications device is in a softer handover (first antennas are located at a single antenna site) or in a soft handover (first antennas are located at multiple antenna sites). In other words, the first antenna(s) forms the active set for the communications device. Active set refers to those cells/antennas via which a communications device communicates with a cellular communications system.

The communications device typically carries out measurements relating to other antennas/cells than only relating to the antennas/cells belonging to its active set. In addition to the antennas belonging to the active set, there may thus be measurement results available relating to at least some of the second antennas. It is possible to take into account signal strength information relating to at least one of the second antennas in determining the second location estimate.

In the following some embodiments are discussed in more detail. These embodiments give examples of how to use information about the second antennas, signals transmitted by which the communications device does not detect, in estimating location of a communications device. In more particular, some these embodiments relate to estimating angular location of the communications device, when timing measurements relating to a single antenna site are available.

Figure 6:
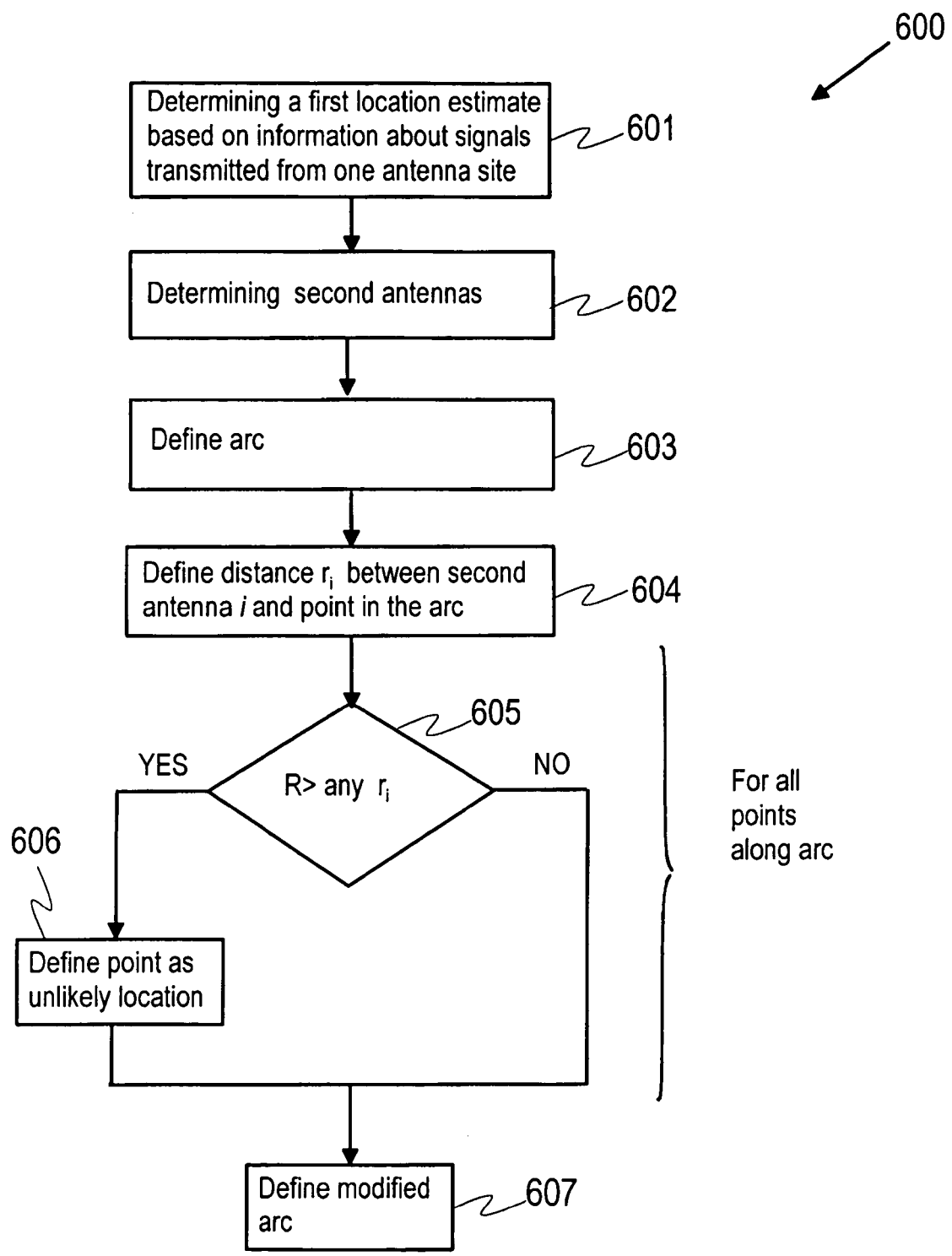
FIG. 6 shows a flowchart of a method in accordance with a second embodiment of the present invention.

FIG. 6 shows a flowchart of a method 600 in accordance with a second embodiment of the invention. This second embodiment relates to using information about locations of the second antennas (antenna sites) in estimating location of a communications device. As only location information of the second antennas is used, the following description refers to antenna sites.

A first location estimate for the communications device is determined in step 601 based on measurement information relating to one or more antennas located in one antenna site. As discussed above, this first location estimate may be a single point or a set of points. Referring to FIG. 4a, this first location estimate may be determined based on only one measurement result for the communications device and the measurement may be from the cell A1. Timing measurements relating to one antenna site gives the distance estimation (R), but it gives no information about the angular direction. The circle with radius R around the site A may be the first location estimate, which thus in this case is a set of points. It is possible that the first location estimate provides some information also on the angular direction of the communications device. For one antenna, for example, half power beam width of the antenna can as an angular location estimate. For two or more antennas located at a single site, it may also be possible to provide an angular location estimate. The first location estimation in step 601 may thus be the circle with radius R or an arc of that circle. As a further example, the first location estimate may be presented as a single point, where the communications device is estimated to be located (for example, a point in the arc at the direction of the antenna), and an uncertainty area. This uncertainty area may be, for example, determined based on the half power beam width of the antenna.

In step 602, second antennas are determined based on the location of the antennas (antenna sites). As one example, the antenna sites nearest to the antenna site of the first antenna(s) may be selected. For example, antennas located within a predetermined distance from the co-located first antennas (or from the first location estimate) may be accepted as second antennas, as long as hese antennas are not used for communication by the communications device. A suitable value for the distance may be determined, for example, using simulations. It is appreciated that the number of second antennas reported from a radio access network to a location server may be quite large, as the location server may select only some of the second antennas once the first location estimate is available.

If the first location estimation does not contain information about the arc, the width and direction of the arc are specified in step 603, typically using the half power beam width of the first antenna(s).

Steps 604 to 606 are performed for each point along the arc, using some feasible resolution. In step 604, distances $r_i$ between the current point along the arc and each of the second antennas (i runs over the sites) are evaluated. In step 605, the distances $r_i$ are compared to the radius R, that is to the distance from the first antenna site. In step 605 it is checked whether the distance to the first antenna site (R) is larger than any of the distances to the second antenna sites ($r_i$). If the distance R is larger, that part of the arc is considered to be non-likely-location for the communications device (step 606). This is because such a point in the arc is closer to (at least) one of the second antennas than the first antennas, and a signal from the close by second antenna would probably be detected by the communications device, were the communications device located at that point of the arc.

In step 607, a modified arc is determined. This modified arc contains those parts of the original arc, which are not non-likely locations of the communications device. In other words, the modified arc contains those part of the original arc, where the radius R is smaller than each of the distances $r_i$. The modified arc and the original radius define the second location estimate.

The idea in this second embodiment of the invention provides a very robust way to ignore the least probable locations of the communications device from the arc. As the least probable locations are ignored, the second location estimate should provide a better accuracy estimate for the location of the communications device than the first location estimate.

Figure 4B:
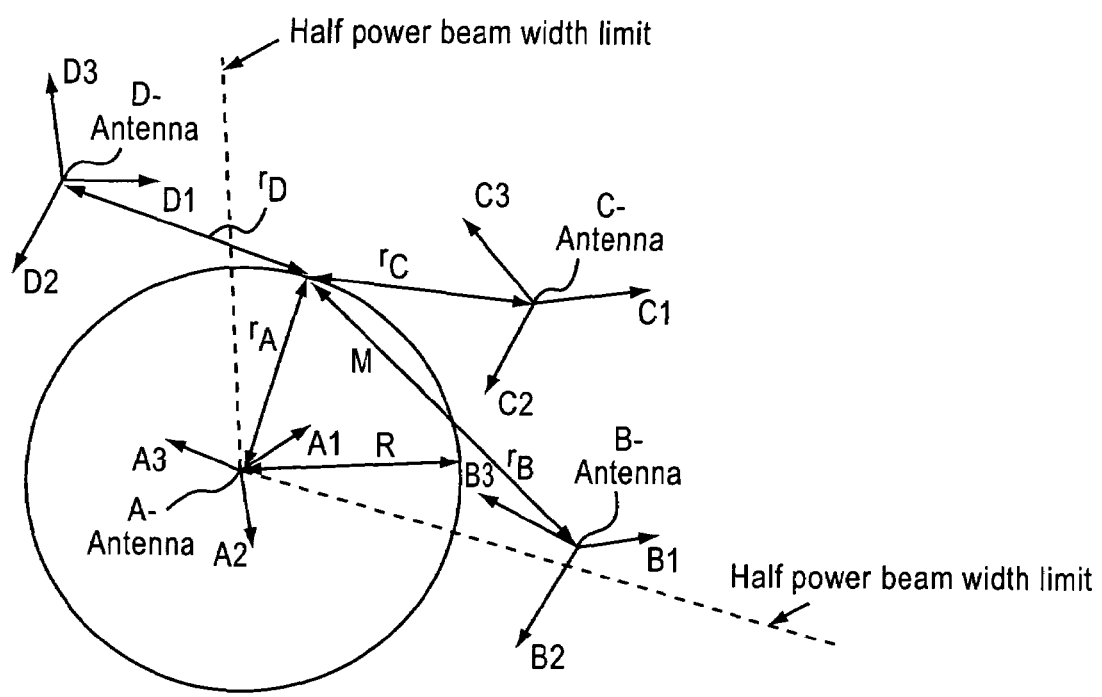
FIG. 4b shows schematically location estimation relating to an embodiment of the invention.

FIG. 4b shows an example of estimating location of the communications device in accordance with the second embodiment of the invention. The antennas and antenna sites are similar to those shown in FIG. 4a. The original arc defined, for example, by the half power beam width is shown with a dashed line. The modified arc is shown with a solid line. It is appreciated that in FIG. 4b the modified arc is that part of the original arc, which is not covered by circles having radius R and centered at antenna sites B, C, and D. In this part of the original arc, the distances to the locations of the second antennas (antenna sites) are larger than the distance to the antenna site A.

A third embodiment of the invention relates to using information about estimated path losses, in addition to locations of the second antennas, in estimating location of a communications device. A method in accordance with the third embodiment starts with similar steps 601-603 as the method 600. The functionality of steps 604-606 is modified in the following way.

For each $r_i$ a path loss is assumed, for example, either by known area information or by an appropriate statistical models, which are widely available.

For each point along the arc, a value indicative of the assumed average signal levels is evaluated for each second antenna. One example is to use the following formula:

$$\frac{P}{R^m + A} - \frac{P_i}{r_i^{n,i} + B} = C,$$

where n,i is the estimated path loss exponent for the propagation in each of the antenna sites (i), and m is the path loss exponent in the cell, in which the measurement was performed. P and $P_i$ are variables or constants that can be based on the power levels, by which the handover decisions are made in cells in question. P and $P_i$ may relate, for example, to power levels of the pilot signals. These values P and $P_i$ may be set by the radio resource controller, and these values may differ from cell to cell. In this case, P and $P_i$ values have an effect on the second location estimate. Alternatively, values P and $P_i$ may be the same in all cells.

The denominators in the equation represent how much of the signal power transmitted from an antenna is left at a given distance from the antenna. In the open space, the power of a propagated signal is inversely proportional to the square of the distance the signal has propagated, but in the mobile environment this is not nearly the case. Therefore the values A and B and the exponents m, n are needed. A and B are variables or constants—a natural choice would be based on a path loss model.

The left side of the equation is basically the power difference of the propagated signals at the assumed location of the communications device. C can then be associated to the difference of the received power from different antennas. C is thus a measure of assumed average signal levels is a specific spot, and C can be compared to $D_1$ and $D_2$, which refer to network parameters defining soft handover. $D_1$ and $D_2$ may be constants that can be set for example by the used Soft Handover window values.

Consider UMTS Terrestrial Radio Access network (UTRAN) as an example. A soft handover leg will be added, if the new signal reaches some level ($D_1$) compared to the best available signal. If D, is, for example, 3 dB the new signal has to be within 3 dB compared to the best handover leg in the active set. In absolute values, the power of the new signal has to be half of the power of the best signal. When a leg's power has dropped and the power is not within some limit ($D_2$) compared again to the best signal, it will be dropped from the active set. It is appreciated that it may be sufficient to use only one value D.

By the value of C the likelihood of the soft handover can be estimated. The smaller the power difference, the more probable a soft handover. In other words, a value of C, which is D>C>−D, indicates that a soft handover is probable. If C<−D, the first cell should not belong to the active set, and the location is not at all a likely location for the mobile communication device. If it is likely that the cell i of one of the second antennas would be in also in the active set in some part of the arc, that part of the arc is a non-likely-location for the communications device.

The procedure is performed throughout the arc. In this case, the arc can be modified by the non-likely-locations similarly as in the method 600. Alternatively, a statistical value representing the likelihood that the communications device is located at a given point in the arc can be allocated throughout the arc. This statistical value may be based on a function, like a function of C.

The idea in this third embodiment is to estimate the coverage of the antenna sites based on the knowledge of the nearby antenna sites taking into account the estimated average propagation models. Not only the worst guesses can be dropped out of the original arc, but some quality or statistical measure can be accompanied with each location throughout the arc.

In this third embodiment, the second location estimate may be, for example, the modified arc together with the original radius. As a second example, the second location estimate may be the original arc and radius together with the statistical values associated with the points of the arc. As a third example, the second location estimate may be a weighted average along the arc defined by the original radius, the statistical values being taking into account in the weighting.

In a fourth embodiment of the invention, also known antenna profiles are used in calculating the second location estimate. The antenna profiles are very dependent on the angular direction, and these profiles are characteristic for an antenna model. The network database may have some knowledge of the used antenna model. Alternatively, a generic antenna model can be used. For example, such a generic antenna model can be based on the half power beam width.

In this fourth embodiment, it is not antenna sites that are considered, but the antennas/cells in each of the sites near by. The direction dependence of the antenna can be included in a similar way as in the third embodiment into the above mentioned formula. P and $P_i$ should be accompanied with antenna specific functions $\Theta_m(\alpha)$ and $\Theta_n(\beta)$ that take the directions $\alpha$ and $\beta$ into account. $\alpha$ represents the direction between a point in the arc and the first antenna, and $\beta$ represents the direction between a point in the arc and the second antenna i.

$$\frac{P \cdot \Theta_m(\alpha)}{R^m + A} - \frac{P_i \cdot \Theta_n(\beta)}{r_i^{n,i} + B} + C$$

Figure 1A:
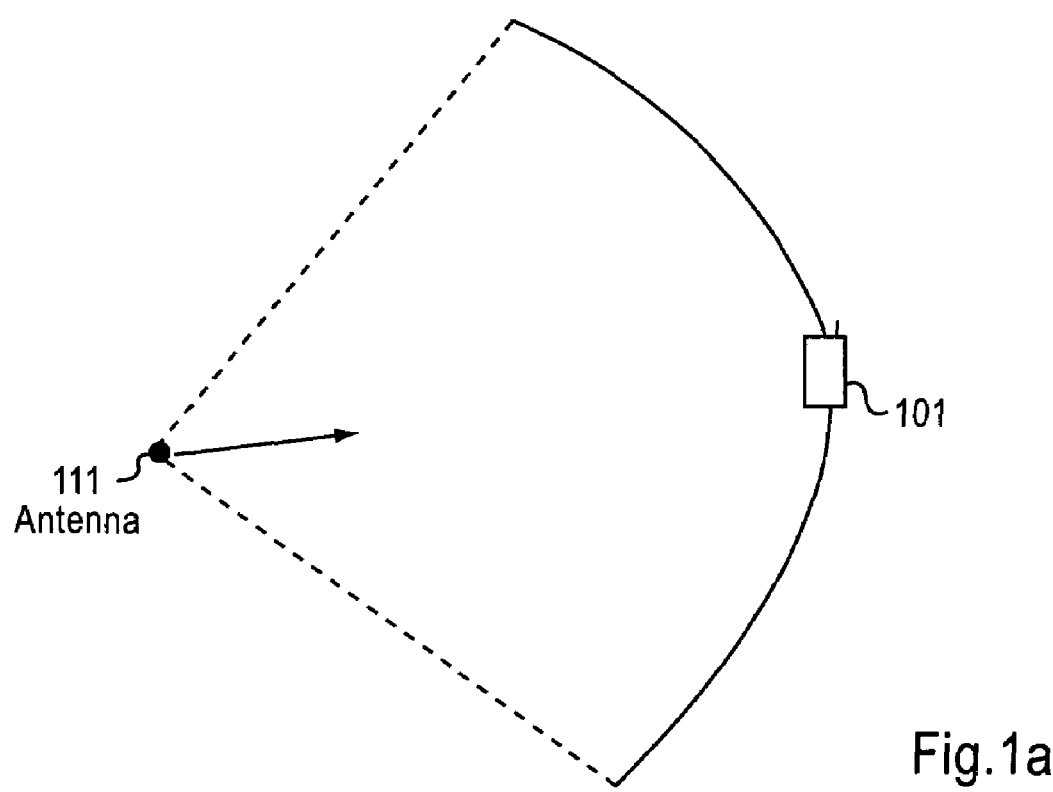
FIG. 1a shows one example of a situation where location estimation accuracy may be poor.
Figure 1B:
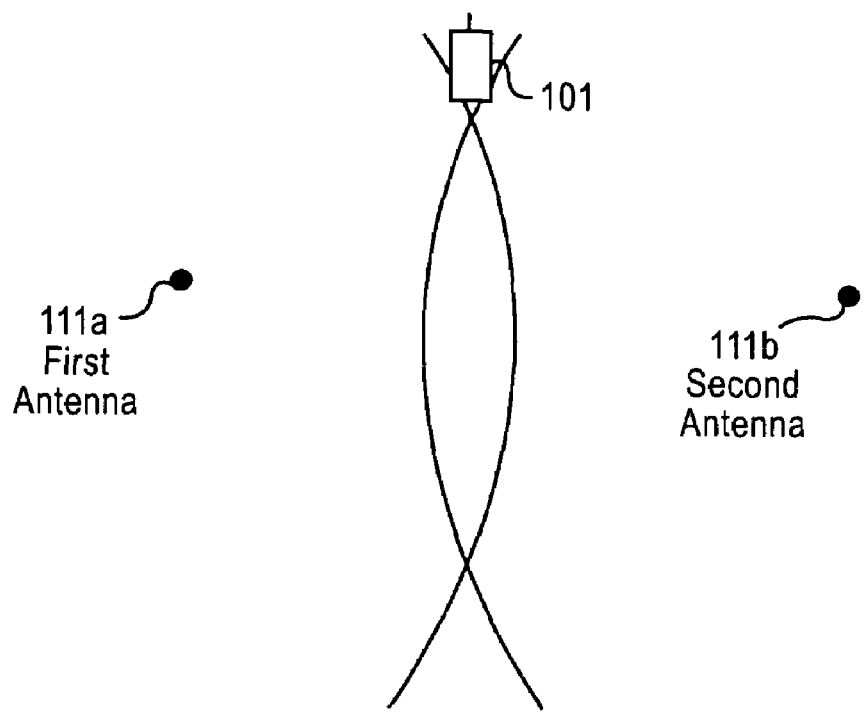
FIG. 1b shows a further example of a situation where location estimation accuracy may be poor.

In a fifth embodiment of the invention, timing measurements may be available from first antennas located at two antenna sites. For example, two radial location estimates $R_1$ and $R_2$ relating to two antenna sites may be available. Information about second antennas may be used to improve location estimation accuracy in a case, where circles defined by these radii $R_1$ and $R_2$ and the antenna sites cross each other (see FIG. 1b). In this case, one of the two crossing points of the circles should be selected as the location estimate for the communications device. There may be also other situations, where two two-dimensional first location estimates are available.

The two crossing points of the circles define two two-dimensional location estimates. Term two-dimensional location estimate refers here to a point, whose location is defined in two dimensions. The location estimate is typically expressed using Cartesian x and y coordinates, but they may be defined also using other coordinate systems.

Figure 7:
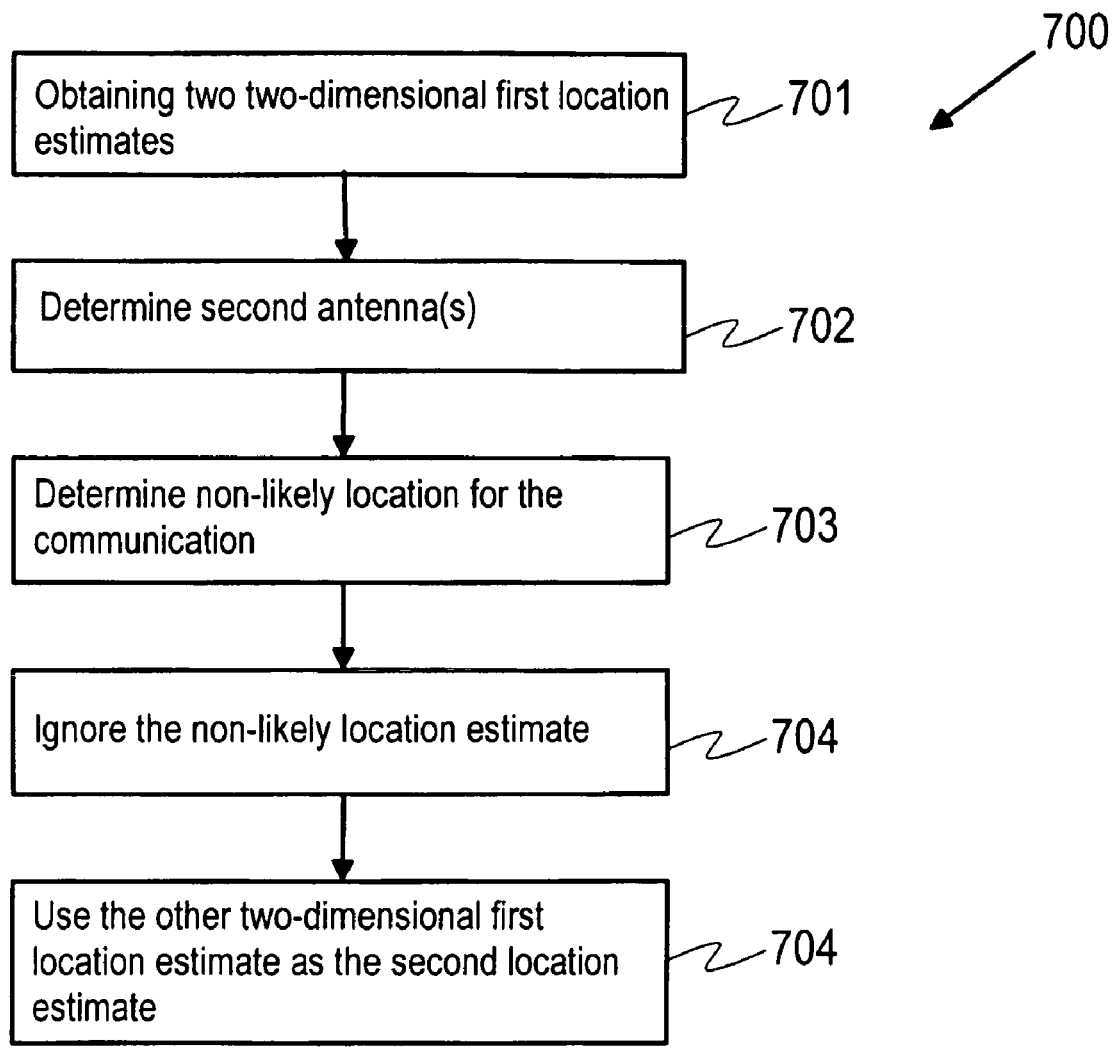
FIG. 7 shows a flowchart of a method in accordance with a fifth embodiment of the present invention.

FIG. 7 illustrates a method 700 in accordance with this fifth embodiment. In step 701, the outcome of the first location estimation is the two crossings point of the circles as first location estimates. Two two-dimensional location estimates are thus obtained. In step 702, it is determined whether in the vicinity of the antennas sites, where the first antennas are located, there is at least one second antenna. Depending on the location (and maybe also on the estimated path loss and/or the antenna profiles) of the second antenna(s), it may be possible to determine, which first location estimates are non-likely locations for the communications device. For example, if there is one second antenna and two first location estimates, it is probable that the first location estimate, which is nearer to the second antenna, is a non-likely location for the communications device. In some cases, however, the second antenna or antenna(s) may be located so that it is not possible to draw conclusions about non-likely locations of the communications device.

Assuming that it is possible to draw conclusions about the non-likely locations in step 703, the non-likely first location estimate is ignored in step 704, thereby determining the other first location estimate as the second location estimate (step 705). In the case, where there are two first location estimates, one of the two first location estimates may thus be selected as the second location estimate.

Alternatively to ignoring non-likely two-dimensional location estimates, it may be possible to assign to the first location estimates statistical values, similarly as discussed above.

It is appreciated that alternatively it is possible that two radii R1 and R2 are provided as first location estimates. This depends on the details of the location estimation algorithm, which is used for determining the first location estimations based on the information available from the signals transmitted between the communications device and the first antennas. In this case, the method 700 may comprise steps for determining two-dimensional location estimates from the available information relating to the radii and the first antenna site locations and for checking the outcome is two two-dimensional location estimates. Should the two radii R1 and R2 define zero or one two-dimensional location estimate, steps 702-705 would not be applicable.

It is appreciated that in some communications systems the antennas may be provided arranged into a number of hierarchy levels. For example, there may be a first hierarchy level consisting of cells having a smaller geographical coverage and a second hierarchy level consisting of cells having a larger geographical coverage, the coverage area of these hierarchy levels at least partly overlapping. Typically handovers are carried out within the hierarchy levels, if possible. As an example, the second hierarchy level of this example could provide coverage for a motorway or other similar area, where communications devices are expected to move fast. The first hierarchy level of this example could provide services for communications devices moving at lower velocity. In determining location estimates, the first antenna(s) typically belongs to a single antenna hierarchy level. When the second antennas are determined, it is typically checked that the second antenna(s) belongs to the same antenna hierarchy level as the at least one first antenna(s).

It is appreciated that a method for locating a communications device may be implemented in a communications system in a separate network element or by distributing the functionality into a number of network elements. The separate network element may be a location server. The location server may be provided as a standalone device. Such a standalone server may reside, for example, in a radio access network of a cellular communications network. Alternatively, a standalone location server may be provided in a core network of a cellular communications network. Alternatively to a standalone device, the location server may be provided as a part of the functionality of other network elements. For example, a radio resource controller may contain functionality for locating communications devices.

Typically information relating to the antennas, for example relating to antenna locations and antenna profiles, is stored in a radio access network. Information about measurement relating to signals transmitted between a communications device and antennas of the communications system is processed typically in the radio access network, for example, in a radio resource controller. A location server typically has access to this information, for being able to estimate location of a communications device.

It is appreciated that in the appended claims reference is made to antennas which are not used for communication by the communications device. The communications device may or may not properly receive signals transmitted from these antennas. The communications device may provide to the communications system measurement reports about signals transmitted from these antennas.

The terms first and second location estimate in the appended claims may refer either to a point (for example, a two-dimensional coordinate) or to a set of points (for example, an arc having a certain center point and a certain angular width). A location estimate may provide an uncertainty area representing accuracy of the location estimation.

It is appreciated that the communications device may be any device, which contains functionality for communicating via or with a communications system. The communications device may be, for example, a portable telephone, a mobile station, a digital personal assistance or a computer.

It is appreciated that a method in accordance with an embodiment of the invention may be implemented using a computer program configured to control a computer accordingly. A computer program may be embodied on a computer-readable medium, stored in a memory of a computer, or carried on a signal.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
   calculating at least one a first location estimate for a communications device based on information relating to signals transmitted between a communications device and at least one first antenna of a communications system,
   selecting at least one second antenna of the communications system, wherein the at least one second antenna not currently used for communication by the communications device, and
   determining a second location estimate for the communications device using the first location estimate and information relating to the at least one second antenna,
   wherein the information relating to the at least one second antenna comprises antenna direction information of the at least one second antenna.

2. A method as defined in claim 1, wherein the information relating to the at least one second antenna comprises: antenna location information, antenna profile information, and path loss information.

3. A method as defined in claim 1, wherein the selecting of the at least one second antenna comprises considering at least one of: antenna location information, antenna direction information, and antenna profile information.

4. A method as defined in claim 1, wherein the second location estimate comprises an angular part and wherein the determining of the second location estimate comprises determining said angular part of the second location estimate, wherein the determining of said angular part comprises taking into account said information relating to the at least one second antenna.

5. A method as defined in claim 1, wherein the at least one first location estimate comprises at least one radial location estimate.

6. A method as defined in claim 5, wherein the second location estimate comprises a radial part and wherein the radial part of the second location estimate is based on the at least one radial location estimate.

7. A method as defined in claim 4, wherein the determining of the angular part of the second location estimate comprised measuring distances between points of an arc relating to a radial part of the second location estimate and the at least one second antenna location.

8. A method as defined in claim 4, wherein the determining of the angular part of the second location estimate comprises measuring estimated path losses relating to the at least one second antenna at points of an arc relating to a radial part of the second location estimate.

9. A method as defined in claim 4, wherein the determining of the angular part of the second location estimate comprises using antenna profile information of the at least one second antenna.

10. A method as defined in claim 1, wherein the determining of the second location estimate comprises selecting one of a plurality of two-dimensional location estimates as the second location estimate.

11. A method as defined in claim 10, wherein the at least one first location estimate comprises at least one of the two-dimensional location estimates.

12. A method as defined in claim 1, wherein the communications device is configured to communicate with the communications system via said at least one first antenna.

13. A method as defined in claim 1, wherein the at least one first antenna is located at a single antenna site.

14. A method as defined in claim 1, wherein the at least one first antenna comprises at least two first antennas located at two separate antenna sites.

15. A method as defined in claim 1, wherein the at least one first antenna comprises at least three first antennas located at separate three antenna sites.

16. A method as defined in claim 1, where the at least one second antenna is located at a single antenna site.

17. A method as defined in claim 1, wherein the at least one second antenna includes at least two second antennas, located at multiple antenna sites.

18. A method as defined in claim 1, wherein the at least one second antenna is located in a geographic location with the at least one first antenna.

19. A method as defined in claim 1, wherein the at least one second antenna is co-located with the at least one first antenna.

20. A method as defined in claim 1, wherein the at least one second antenna is located at a separate antenna site than the at least one first antenna.

21. A method as defined in claim 1, wherein the at least one first antenna belongs to a single antenna hierarchy level.

22. A method as defined in claim 21, comprising:
   checking that the at least one second antenna belongs to said single antenna hierarchy level of the at least one first antenna.

23. A method as defined in claim 1, wherein the calculating of at least one a first location estimate comprising using at least one of the group that includes cell identity information relating to the at least one first antenna, and timing information relating to signals transmitted between the communications device and the at least one first antenna.

24. A system comprising:
a plurality of antennas; and
a processor configured to
calculate at least one first location estimate for a communications device based on information relating to signals transmitted between a communications device and at least one first antenna of the system,
select at least one second antenna of the communications system, the at least one second antenna not used for communication by the communications device, and
determine a second location estimate for the communications device based on the at least one first location estimate and information relating to the at least one second antenna,
wherein the information relating to the at least one second antenna comprises antenna direction information of the at least one second antenna.

25. An apparatus, comprising:
a processor configured to
participate in a communications system comprising a plurality of antennas,
calculate at least one first location estimate for a communications device based on information relating to signals transmitted between the communications device and at least one first antenna of a communications system,
select at least one second antenna of the communications system, the at least one second antenna not used for communication by the communications device, and
determine a second location estimate for the communications device based on the at least one first location estimate and information relating to the at least one second antenna,
wherein the information relating to the at least one second antenna comprises antenna direction information of the at least one second antenna.

26. An apparatus as defined in claim 25, comprising a location server.

27. An apparatus defined in claim 26, wherein the processor is further configured to receive information about antennas of the communications system and to determine said at least one second antenna based on the information about antennas of the communications system.

28. An apparatus as defined in claim 25, comprising a radio resource controller.

29. A system, comprising:
a plurality of antennas,
calculating means for calculating at least one first location estimate for a communications device based on information relating to signals transmitted between the communications device and at least one first antenna of the communications system,
selecting means for selecting at least one second antenna of the communications system, the at least one second antenna not used for communication by the communications device, and
determining means for determining a second location estimate for the communications device based on the at least one first location estimate and information relating to the at least one second antenna,
wherein the information relating to the at least one second antenna comprises antenna direction information of the at least one second antenna.

30. An apparatus, comprising:
connecting means for connecting to a communications system comprising a plurality of antennas,
calculating means for calculating at least one first location estimate for a communications device based on information relating to signals transmitted between the communications device and at least one first antenna of a communications system,
selecting means for selecting at least one second antenna of the communications system, the at least one second antenna not used for communication by the communications device, and
determining means for determining a second location estimate for the communications device based on the at least one first location estimate and information relating to the at least one second antenna,
wherein the information relating to the at least one second antenna comprises antenna direction information of the at least one second antenna.

31. A computer readable medium comprising computer executable program instructions to perform a method comprising:
calculating at least one first location estimate for a communications device based on information relating to signals transmitted between the communications device and at least one first antenna of a communications system,
selecting at least one second antenna of the communications system, the at least one second antenna not used for communication by the communications device, and
determining a second location estimate for the communications device based on the at least one first location estimate and information relating to the at least one second antenna,
wherein the information relating to the at least one second antenna comprises antenna direction information of the at least one second antenna.

32. An apparatus, comprising:
a connector configured to connect to a communications system comprising a plurality of antennas,
a calculator configured to calculate at least one first location estimate for a communications device based on information relating to signals transmitted between the communications device and at least one first antenna of a communications system,
a selector configured to select at least one second antenna of the communications system, the at least one second antenna not used for communication by the communications device, and
determining circuitry configured to determine a second location estimate for the communications device based on the at least one first location estimate and information relating to the at least one second antenna,
wherein the information relating to the at least one second antenna comprise antenna direction information of the at least one second antenna.

33. An apparatus as defined in claim 32, wherein the information relating to the at least one second antenna comprises: antenna location information, antenna profile information, and path loss information.

34. An apparatus as defined in claim 32, wherein the selector is configured to consider at least one of: antenna location information, antenna direction information, and antenna profile information.

35. An apparatus as defined in claim 32, wherein the second location estimate comprises an angular part and wherein the determining circuitry is configured to determine said angular part of the second location estimate comprising taking into account said information relating to the at least one second antenna.

36. An apparatus as defined in claim 32, wherein the at least one first location estimate comprises at least one radial location estimate.

37. An apparatus as defined in claim 36, wherein the second location estimate comprises a radial part and wherein the radial part of the second location estimate is based on the at least one radial location estimate.

38. An apparatus as defined in claim 35, wherein the determining circuitry is configured to measure distances between points of an arc relating to a radial part of the second location estimate and the at least one second antenna location.

39. An apparatus as defined in claim 35, wherein the determining circuitry is configured to measure estimated path losses relating to the at least one second antenna at points of an arc relating to a radial part of the second location estimate.

40. An apparatus as defined in claim 35, wherein the determining of the angular part of the second location estimate comprises using antenna profile information of the at least one second antenna.

41. An apparatus as defined in claim 32, wherein the determining circuitry is configured to select one of a plurality of two-dimensional location estimates as the second location estimate.

42. An apparatus as defined in claim 41, wherein the at least one first location estimate comprises at least one of the two-dimensional location estimates.

43. An apparatus as defined in claim 32, wherein the communications device is configured to communicate with the communications system via said at least one first antenna.

44. An apparatus as defined in claim 32, wherein the at least one first antenna is located at a single antenna site.

45. An apparatus as defined in claim 32, wherein the at least one first antenna comprises at least two first antennas located at two separate antenna sites.

46. An apparatus as defined in claim 32, wherein the at least one first antenna comprises at least three first antennas located at separate three antenna sites.

47. An apparatus as defined in claim 32, where the at least one second antenna is located at a single antenna site.

48. An apparatus as defined in claim 32, wherein the at least one second antenna includes at least two second antennas, located at multiple antenna sites.

49. An apparatus as defined in claim 32, wherein the at least one second antenna is located in a geographic location with the at least one first antenna.

50. An apparatus as defined in claim 32, wherein the at least one second antenna is co-located with the at least one first antenna.

51. An apparatus as defined in claim 32, wherein the at least one second antenna is located at a separate antenna site than the at least one first antenna.

52. An apparatus as defined in claim 32, wherein the at least one first antenna belongs to a single antenna hierarchy level.

53. An apparatus as defined in claim 52, wherein the selector is configured to check that the at least one second antenna belongs to said single antenna hierarchy level of the at least one first antenna.

54. An apparatus as defined in claim 32, wherein the calculator configured to use at least one of the group that includes cell identity information relating to the at least one first antenna, and timing information relating to signals transmitted between the communications device and the at least one first antenna.

* * * * *